United States Patent
Kashiwai et al.

(10) Patent No.: US 8,739,914 B2
(45) Date of Patent: Jun. 3, 2014

(54) THREE-WHEELED VEHICLE WITH STEERING APPARATUS CONFIGURED FOR ENHANCED OPERATION DURING A BANKING TURN

(71) Applicant: Honda Motor Co., Ltd., Tokyo (JP)

(72) Inventors: Mikio Kashiwai, Wako (JP); Yoshitaka Kobayashi, Wako (JP); Takashi Tominaga, Wako (JP); Takato Watanabe, Wako (JP); Yoshiyuki Horii, Wako (JP); Hisashi Matsuo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/974,242

(22) Filed: Aug. 23, 2013

(65) Prior Publication Data

US 2014/0060951 A1 Mar. 6, 2014

(30) Foreign Application Priority Data

Aug. 31, 2012 (JP) .................................. 2012-191548
Apr. 26, 2013 (JP) .................................. 2013-094387

(51) Int. Cl.
*B62D 3/02* (2006.01)
*B62D 9/02* (2006.01)

(52) U.S. Cl.
USPC .................. 180/210; 280/5.509; 280/124.103

(58) Field of Classification Search
USPC .................. 180/210, 211; 280/93.512, 5.509, 280/124.103, 263
See application file for complete search history.

(56) References Cited

U.S. PATENT DOCUMENTS

| 7,487,985 | B1 * | 2/2009 | Mighell ................. 280/124.103 |
| 8,235,398 | B2 * | 8/2012 | Mercier ....................... 280/5.51 |
| 8,602,421 | B2 * | 12/2013 | Mercier ..................... 280/5.509 |
| 2008/0164085 | A1 * | 7/2008 | Cecinini ........................ 180/210 |
| 2008/0238005 | A1 * | 10/2008 | James ......................... 280/5.509 |
| 2010/0007109 | A1 * | 1/2010 | Mighell ................. 280/124.103 |
| 2011/0248463 | A1 * | 10/2011 | Mighell ................. 280/124.103 |

FOREIGN PATENT DOCUMENTS

JP 2010-064560 A 3/2010

* cited by examiner

*Primary Examiner* — Drew Brown
(74) *Attorney, Agent, or Firm* — Carrier Blackman & Associates, P.C.; Joseph P. Carrier; William D. Blackman

(57) ABSTRACT

A three-wheeled vehicle having two steerable front wheels is provided with steering structure configured to enhance turning performance during banking of a vehicle body. A bushing is secured to the vehicle body, and includes an inner cylinder and an outer cylinder connected by an elastic member. Knuckles, for pivotally supporting the front wheels, are supported by knuckle supports installed on steering arms secured to the outer cylinder. A first lever mounted on a steering shaft is connected via a connecting rod to a second lever mounted on a sub-steering shaft pivotally passing through the inner cylinder. A third lever installed on the sub-steering shaft is connected to the knuckles via corresponding tie rods. A rigid rod has a first end connected to a fourth lever secured to the outer cylinder via a first universal joint and a second end connected to the body frame via a second universal joint.

20 Claims, 10 Drawing Sheets

THREE-WHEELED VEHICLE WITH STEERING APPARATUS CONFIGURED FOR ENHANCED OPERATION DURING A BANKING TURN

CROSS-REFERENCE TO RELATED APPLICATIONS

The present invention claims priority under 35 USC 119 based on Japanese patent application No. 2012-191548, filed on Aug. 31, 2012. The entire subject matter of this priority document, including specification claims and drawings thereof, is incorporated by reference herein.

BACKGROUND OF THE INVENTION

1. Field of the Invention

The present invention relates to a vehicle in which a steering handlebar for steering a pair of left and right front wheels is mounted to the upper end of a steering shaft, and the steering shaft is pivotally supported by a head pipe constituting part of a body frame.

2. Description of the Background Art

Patent Document 1, below, discloses a tricycle in which a steering handlebar is mounted to the upper end of a steering shaft pivotally supported by a head pipe. A lever, mounted to the lower end of the steering shaft, is steerably supported by a front frame. The front frame is pivotally supported by the head pipe. In addition, the lever is connected via a tie rod to one of a pair of left and right front wheels connected to each other via a connecting rod. A pair of left and right springs are connected between the head pipe and the front frame, in order to maintain the head pipe in a vertical position when not in use.

[Patent Document 1] Japanese Patent Laid-Open No. 2010-64560

SUMMARY OF THE INVENTION

1. Problem to be Solved by the Invention

In the three-wheeled vehicle disclosed in the above Patent Document 1, the front wheels can be steered in response to the operation of the steering handlebar. A head pipe pivotally supports a front frame, and the front frame steerably supports the left and right front wheels. Therefore, the vehicle can be turned while banking the head pipe. However, when the vehicle is operatively turned with the head pipe banked, the direction of the force, caused by the banking, applied to the lever mounted on the lower end of the steering shaft is opposite to the operating direction of the steering shaft. Therefore, it is difficult to exhibit satisfactory turning performance.

The present invention has been made in view of such situations, and it is an object of the present invention to provide structure which improves turning during the banking of a vehicle body in order to enhance steering response in a vehicle such as a three-wheeled vehicle or the like having two steerable front wheels.

2. Means for Solving the Problem

To achieve the above object, a first aspect of the present invention is characterized in that in a vehicle in which a steering handlebar is mounted to an upper end of a steering shaft, and the steering shaft is pivotally supported by a head pipe constituting part of a body frame; the body frame including a front frame portion extending forward from the head pipe.

The vehicle further includes a bushing including an inner cylinder having a vertically extending central axis, an outer cylinder, the outer cylinder surrounding the inner cylinder, and an elastic member interposed between the inner cylinder and the outer cylinder, wherein the inner cylinder is supported at a vehicle-widthwise central portion of the body frame.

The vehicle further includes a pair of vehicle-widthwise extending left and right steering arms having inner end portions secured to the outer cylinder, and knuckle-supporting portions installed at outer end portions thereof; a sub-steering shaft pivotally passing through the inner cylinder; a pair of left and right knuckles individually and pivotally supporting the corresponding respective left and right front wheels, the knuckles being steerably supported by the corresponding knuckle-supporting portions of the left and right steering arms; a first lever mounted to a lower end portion of the steering shaft so as to be turned together with the steering shaft, and a second lever mounted to an upper end portion of the sub-steering shaft, the first and second levers connected via a connecting rod, a third lever installed at a lower end portion of the sub-steering shaft, the third lever connected to the left and right knuckles via corresponding individual tie rods, a fourth lever secured to a rear portion of the outer cylinder, and a rigid movement-transmitting rod having a first end connected to the fourth lever via a first universal joint, and a second end connected to the body frame via a second universal joint.

In addition to the first aspect hereof, a second aspect of the present invention is characterized in that the left and right front wheels have axles having axes. The front frame portion includes a pair of left and right first frame portions secured respectively to left and right lower side portions of the head pipe and extending downwardly therefrom, a pair of left and right second frame portions disposed below the respective axes of the axles of the front wheels and extending forward from corresponding lower ends of the first frame portions, a pair of left and right third frame portions disposed in front of the steering arms and extending upward from the corresponding front ends of the second frame portions, and a pair of left and right fourth frame portions disposed at respective positions higher than the corresponding respective axes of the axles and extending vehicle-widthwise inward from the corresponding upper ends of the pair of left and right third frame portions, and the front frame portion is formed in a symmetrical shape with respect to a vertical plane which passes a central axis of the steering shaft in the front-to-rear direction.

In addition to the first aspect hereof, a third aspect of the present invention is characterized in that a U-shaped bracket opening toward the rear of the vehicle body is supported by a vehicle-widthwise central portion of a front end of the front frame portion, and wherein the inner cylinder of the bushing is secured to the bracket.

In addition to the first aspect hereof, a fourth aspect of the present invention is characterized in that the vehicle includes an occupant's seat, a single rear wheel, an electric motor suspended by the body frame, and a battery to power the electric motor, and wherein: the body frame has a seat tube extending vertically so as to support the occupant's seat, the single rear wheel is suspended by the body frame and is driven by the electric motor, and the battery is disposed on the seat tube or the head pipe.

In addition to the third aspect hereof, a fifth aspect of the present invention is characterized in that a damper mechanism is disposed between the bracket and the front frame portion.

In addition to the fourth aspect hereof, a sixth aspect of the present invention is characterized in that a pair of left and right folding auxiliary wheels are pivotally supported at the rear portion of the body frame in such a manner as to be brought into contact with ground at a position in the rear of the rear wheel in a deployed state thereof.

In addition to the fourth aspect hereof, a seventh aspect of the present invention is characterized in that the vehicle includes a step floor, and the body frame includes a main frame portion extending rearward from the head pipe, the seat tube has an intermediate portion and is secured in an upright position at an intermediate portion of the main frame portion, a suspending frame portion connects the intermediate portion of the seat tube with a rear end portion of the main frame portion, the step floor is secured onto the main frame portion so as to be at least partially disposed in front of the seat tube and can be used as a footrest by the occupant, and the rear wheel is rotatably supported at a connecting portion between the rear end portion of the main frame portion and the suspending frame portion.

In addition to the fourth aspect hereof, an eighth aspect of the present invention is characterized in that a first pivot point where the head pipe can be swung back and forth is set at the front portion of the main frame portion, a second pivot point where an upper portion of the seat tube including the occupant's seat can be swung back and forth is set at an intermediate portion of the seat tube, a sub-frame extending parallel to a straight line connecting the first and second pivot points together has a first end which is pivotally connected to the head pipe or the main frame via a connecting pin and a second end which is pivotally connected to the seat tube via a connecting pin, the connecting pins having axes parallel to the swinging axes of the first and second pivot points, and a portion of the body frame and the sub-frame constitute a parallel link.

In addition to the eighth aspect hereof, a ninth aspect of the present invention is characterized in that the parallel link is provided with a suspension.

In addition to the ninth aspect hereof, a tenth aspect of the present invention is characterized in that the suspension is installed between one end portion of the sub-frame portion and one of the first and second pivot points so as to be located on a line diagonal to the parallel link.

An eleventh aspect of the invention is characterized in that in a three-wheeled electric vehicle, including a body frame having a single rear wheel rotatably mounted thereon, the body frame includes a head pipe. The vehicle further includes an electric motor attached to the body frame for driving the rear wheel; a battery case operatively attached to the body frame; a battery disposed in the battery case for supplying electric power to the electric motor; a steering handlebar mounted to an upper end of a steering shaft for steering a pair of left and right front wheels, wherein the steering shaft is pivotally supported by the head pipe. The vehicle further includes a bushing having an inner cylinder and an outer cylinder surrounding the inner cylinder; wherein the inner cylinder is supported at a vehicle-widthwise central portion of the body frame; a sub-steering shaft pivotally passing through the inner cylinder; a pair of vehicle-widthwise extending left and right steering arms having inner end portions secured to the outer cylinder, wherein the left and right front wheels are pivotally mounted at the corresponding outer end portions of the steering arms; a first lever mounted to a lower end portion of the steering shaft so as to be turned together with the steering shaft; a second lever mounted to an upper end portion of the sub-steering shaft, the first and second levers connected via a connecting rod; a third lever installed at a lower end portion of the sub-steering shaft, the third lever operable to steer the left and right wheels via corresponding individual tie rods, a fourth lever secured to a rear portion of the outer cylinder, wherein when the body frame of the vehicle is leaning towards the inside of a turn, the effect on steering due to a leaning of the body frame is coordinated with the effect on steering due to a steering of the handlebar.

In addition to the eleventh aspect hereof, a twelfth aspect of the present invention is characterized in that the vehicle further includes a rigid movement-transmitting rod having a first end connected to the fourth lever via a first universal joint, and a second end connected to the body frame via a second universal joint, such that the force from the leaning of the body frame is transmitted from the body frame to the fourth lever.

In addition to the twelfth aspect hereof, a thirteenth aspect of the present invention is characterized in that the vehicle includes a pair of left and right knuckle support portions, the left and right knuckle-supporting portions being secured to the outer end portions of the corresponding steering arms; a pair of left and right knuckles supporting the corresponding left and right front wheels, the left and right knuckles being steerably supported by the corresponding knuckle support portions; wherein the third lever is connected to the left and right knuckles via the tie rods, such that a force for steering the left and right front wheels is transmitted from steering the handlebars to the left and right front wheels.

In addition to the twelfth aspect hereof, a fourteenth aspect of the present invention is characterized in that the vehicle further includes a rigid movement-transmitting rod having a first end connected to the fourth lever via a first universal joint and a second end connected to the body frame via a second universal joint; wherein the bushing further includes an elastic member interposed between the inner cylinder and the outer cylinder; and force from leaning of the body frame towards the inside of a turn is transmitted to the left and right front wheels via the rigid movement-transmitting rod and the bushing such that the effect on steering due to the leaning of the body frame is coordinated with the effect on steering due to the steering of the handlebar.

In addition to the fourteenth aspect hereof, a fifteenth aspect of the present invention is characterized in that the left and right front wheels have axles having axes, the body frame has a front frame portion including a pair of left and right first frame portions secured respectively to left and right lower side portions of the head pipe and extending downward therefrom, a pair of left and right second frame portions disposed below the corresponding axes of the axles of the front wheels and extending forward from corresponding lower ends of the first frame portions, a pair of left and right third frame portions disposed in front of the steering arms and extending upward from the corresponding front ends of the second frame portions, and a pair of left and right fourth frame portions disposed at positions higher than the corresponding axes of the axles and extending vehicle-widthwise inward from the corresponding upper ends of the pair of left and right third frame portions, and the front frame portion is formed in a symmetrical shape with respect to a vertical plane which passes a central axis of the steering shaft in the front-to-rear direction.

In addition to the twelfth aspect hereof, a sixteenth aspect of the present invention is characterized in that the vehicle further includes a U-shaped bracket, an occupant's seat wherein the body frame includes a main frame portion, a seat tube, and a front frame portion having a front end, the seat tube extends vertically so as to support the occupant's seat, the U-shaped bracket opens toward the rear of the vehicle body and is supported by a vehicle-widthwise central portion of the front end of the front frame portion, and the inner cylinder of the bushing is secured to the bracket.

In addition to the sixteenth aspect hereof, a seventeenth aspect of the present invention is characterized in that a damper mechanism is disposed between the bracket and the front frame portion.

In addition to the sixteenth aspect hereof, an eighteenth aspect of the present invention is characterized in that a first pivot point where the head pipe can be swung back and forth is set at a front portion of the main frame portion, a second pivot point where an upper portion of the seat tube including the occupant's seat can be swung back and forth is set at an intermediate portion of the seat tube, a sub-frame extending parallel to a straight line connecting the first and second pivot points together has a first end which is pivotally connected to the head pipe or the main frame via a connecting pin and a second end which is pivotally connected to the seat tube via a connecting pin, the connecting pins having axes parallel to the pivot axes of the first and second pivot points, and a portion of the body frame and the sub-frame constitute a parallel link.

In addition to the eighteenth aspect hereof, a nineteenth aspect of the present invention is characterized in that the parallel link is provided with a suspension.

In addition to the nineteenth aspect hereof, a twentieth aspect of the present invention is characterized in that the suspension is installed between a first end portion of the sub-frame and one of the first and second swivel points so as to be located on a line diagonal to the parallel link.

Incidentally, a saddle 11 of the embodiments corresponds to the occupant's seat of the present invention. An elastic member 39 of the embodiments corresponds to the elastic member of the present invention. Fifth and sixth universal joints 68, 69 of the embodiments correspond to the universal joints of the present invention.

Effects of the Invention

According to the first aspect of the present invention, when the steering handlebar is operated, the turning of the steering shaft is transmitted to the pair of left and right knuckles via the first lever, the connecting rod, the sub-steering shaft, the second lever and the pair of corresponding left and right tie rods. The front wheels pivotally supported by the pair of the left and right knuckles are steered. In addition, a bushing is formed of an inner cylinder and an outer cylinder connected by an elastic member. The inner cylinder of the bushing has a vertically extending central axis and is supported at the vehicle-widthwise central portion of the front frame extending forward from the head pipe. The knuckle support portion steerably supporting the pair of left and right knuckles is secured at the corresponding outer end portions of the pair of left and right steering arms. The pair of left and right steering arms have inner end portions secured to the outer cylinder of the bushing. The rigid, movement-transmitting rod has a first end connected via a universal joint to the fourth lever secured to the rear portion of the outer cylinder and a second end connected to the body frame via another universal joint. If an occupant banks the vehicle body toward the inside of turn, the banking force is applied to the outer cylinder of the bushing via the rod. The banking force is applied from the outer cylinder to the pair of left and right knuckles via the pair of corresponding left and right steering arms. Therefore, the direction of the force applied by the banking is the same as the operating direction of the steering shaft. Thus, satisfactory turning performance can be exhibited.

According to the second aspect of the present invention, the front frame can be compactly configured surrounding the steering mechanism including the bushing.

According to the third aspect of the present invention, the inner cylinder of the bushing is secured to the U-shaped bracket supported by the front frame. In this way, the inner cylinder of the bushing can be compactly secured to the body frame.

According to the fourth aspect of the present invention, the battery for supplying electric power to the electric motor for driving the single rear wheel is disposed on the seat post or the head pipe constituting part of the body frame. In this manner, the battery can be compactly disposed on the vehicle without causing increases to the dimensions of the vehicle.

According to the fifth aspect of the present invention, the damper mechanism is disposed between the bracket and the front frame. Therefore, it is possible to effectively prevent the vibration of the vehicle body from being transmitted to the steering handlebar during travel, in addition to the damping effect of the bushing.

According to the sixth aspect of the present invention, the pair of left and right folding auxiliary wheels are brought into contact with ground at a position behind the rear wheel when in a deployed state. Therefore, the vehicle can travel in a stable manner and the auxiliary wheels can contribute to the stabilization of the vehicle body posture particularly during travel on an inclined surface.

According to the seventh aspect of the present invention, the body frame can be configured to include the head pipe; the main frame extending rearward from the head pipe; the seat tube installed upright at an intermediate portion of the main frame portion; and the suspending frame portion connecting the intermediate portion of the seat tube with the rear end portion of the main frame portion. Therefore, the body frame can be formed compactly so as to be suitable for vehicles having two front wheels. The step floor is secured onto the main frame in such a manner as to be at least partially disposed in front of the seat tube to provide a footrest for the occupant. Further, the rear wheel is rotatably supported at the connecting point between the rear end portion of the main frame portion and the suspending frame portion. Therefore, the rear wheel can be pivotally supported in a stable manner.

According to the eighth aspect of the present invention, the sub-frame portion extending parallel to the straight line connecting the first pivot point set at the front portion of the main frame with the second pivot point set at the intermediate portion of the seat tube has a first end which is pivotally connected to the head pipe or the main frame and a second end which is pivotally connected to the seat tube. A portion of the body frame and the sub-frame portion constitute a parallel link. Therefore, the head pipe and the occupant's seat can be tilted back and forth during travel on an inclined road surface, whereby the riding posture can be maintained.

According to the ninth aspect of the present invention, while maintaining a basic framework of the parallel link, a suspension installed on the parallel link can absorb vibration by deforming the frame formation when a given load is applied thereto.

According to the tenth aspect of the present invention, the suspension is installed on a line diagonal to the parallel link, which allows for the effective arrangement of the suspension.

According to the eleventh aspect of the present invention, when the steering handlebar is operated, the turning of the steering shaft is transmitted to the left and right front wheels via the first lever, the connecting rod, the sub-steering shaft, and the second lever. The front wheels are steered. In addition, a bushing is formed of an inner cylinder and an outer cylinder. The inner cylinder of the bushing is supported at the vehicle-widthwise central portion of the body frame. The pair of left and right steering arms have inner end portions secured to the outer cylinder of the bushing. A banking force experienced by the bushing is transmitted from the outer cylinder to the left and right wheels via the pair of corresponding left and right steering arms. If the occupant of the vehicle banks the vehicle towards the inside of a turn, the direction of the force applied by the banking is the same as the operating direction of the steering shaft. Thus, satisfactory turning performance can be exhibited.

According to the twelfth aspect of the present invention, the rigid movement-transmitting rod transmits force from banking the vehicle from the vehicle body frame to the bushing and the bushing transmits the movement to the pair of left and right wheels via the pair of left and right steering arms. Therefore, if the occupant of the vehicle banks the vehicle towards the inside of a turn, the direction of the force applied by the banking is the same as the operating direction of the steering shaft. Thus, satisfactory turning performance can be exhibited.

According to the thirteenth aspect of the present invention, when the steering handlebar is operated, the turning of the steering shaft is transmitted to the pair of left and right knuckles via the first lever, the connecting rod, the sub-steering shaft, the second lever, the third lever and the pair of corresponding tie rods. Thus, the front wheels are steered.

According to the fourteenth aspect of the present invention, when an occupant leans towards the inside of a turn while turning the vehicle, the force of the leaning is transferred from the body frame to the bushing via the rigid movement-transmitting rod and the bushing transmits the force of the leaning to the left and right front wheels via the steering arms, such that the direction of the force applied by the banking is the same as the operating direction of the steering shaft. Thus, satisfactory turning performance can be exhibited.

According to the fifteenth aspect of the present invention, the front frame portion can be compactly configured around the steering mechanism including the bushing.

According to the sixteenth aspect of the present invention, the inner cylinder of the bushing is secured to the U-shaped bracket supported by the front frame portion and a seat is provided for the occupant.

According to the seventeenth aspect of the present invention, the damper mechanism is disposed between the bracket and the front frame. Therefore, it is possible to effectively prevent the vibration of the vehicle body from being transmitted to the steering handlebar during travel, in addition to the damping effect of the bushing.

According to the eighteenth aspect of the present invention, the sub-frame portion extending parallel to the straight line connecting the first pivot point set at the front portion of the main frame with the second pivot point set at the intermediate portion of the seat tube has a first end which is pivotally connected to the head pipe or the main frame and a second end which is pivotally connected to the seat tube. A portion of the body frame and the sub-frame portion constitute a parallel link. Therefore, the head pipe and the occupant's seat can be tilted back and forth during travel on an inclined road surface, whereby the riding posture can be maintained.

According to the nineteenth aspects of the present invention, while maintaining a basic framework of the parallel link, a suspension installed on the parallel link can absorb vibration by deforming the frame formation when a given load is applied thereto.

According to the twentieth aspect of the present invention, the suspension is installed on a line diagonal to the parallel link, which allows for the effective arrangement of the suspension.

DETAILED DESCRIPTION

Figure 1:
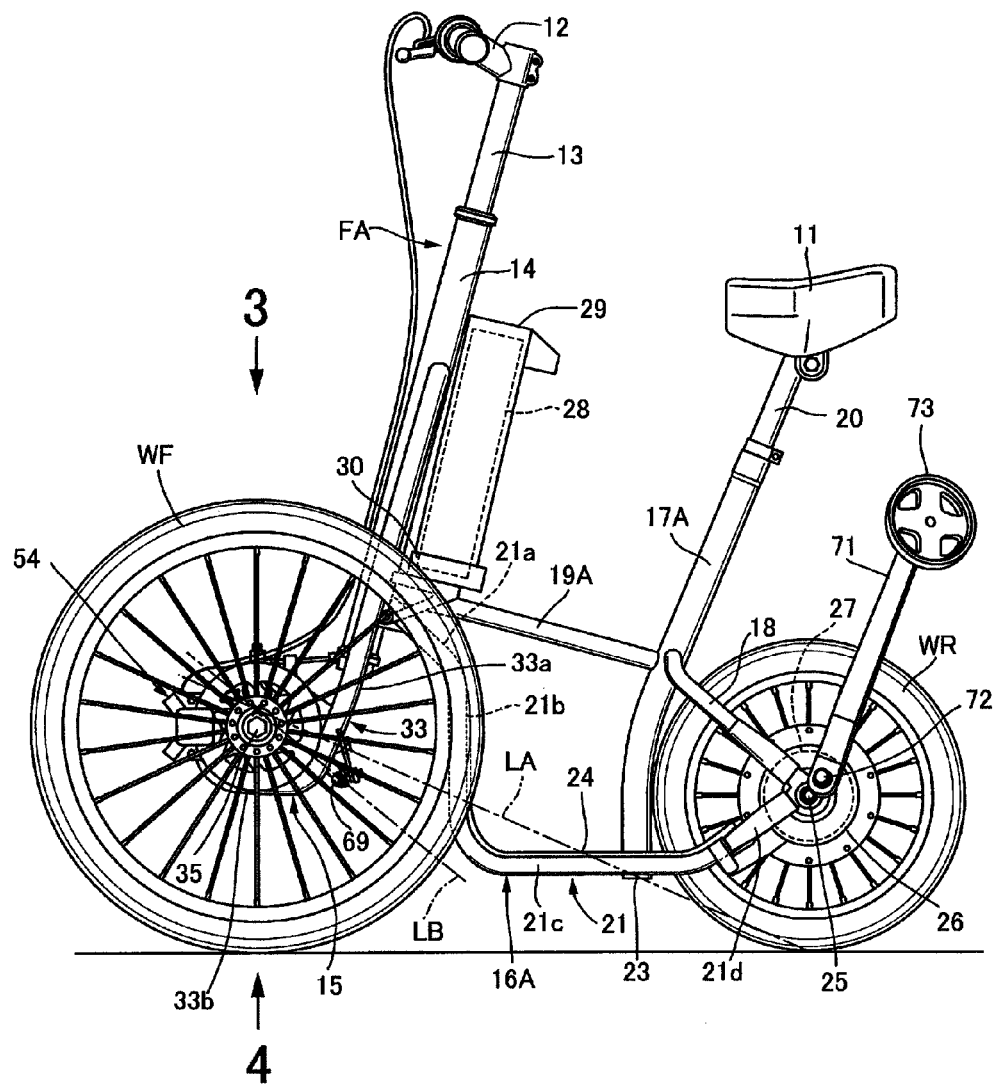
FIG. 1 is a left lateral view of a three-wheeled vehicle according to a first embodiment.
Figure 2:
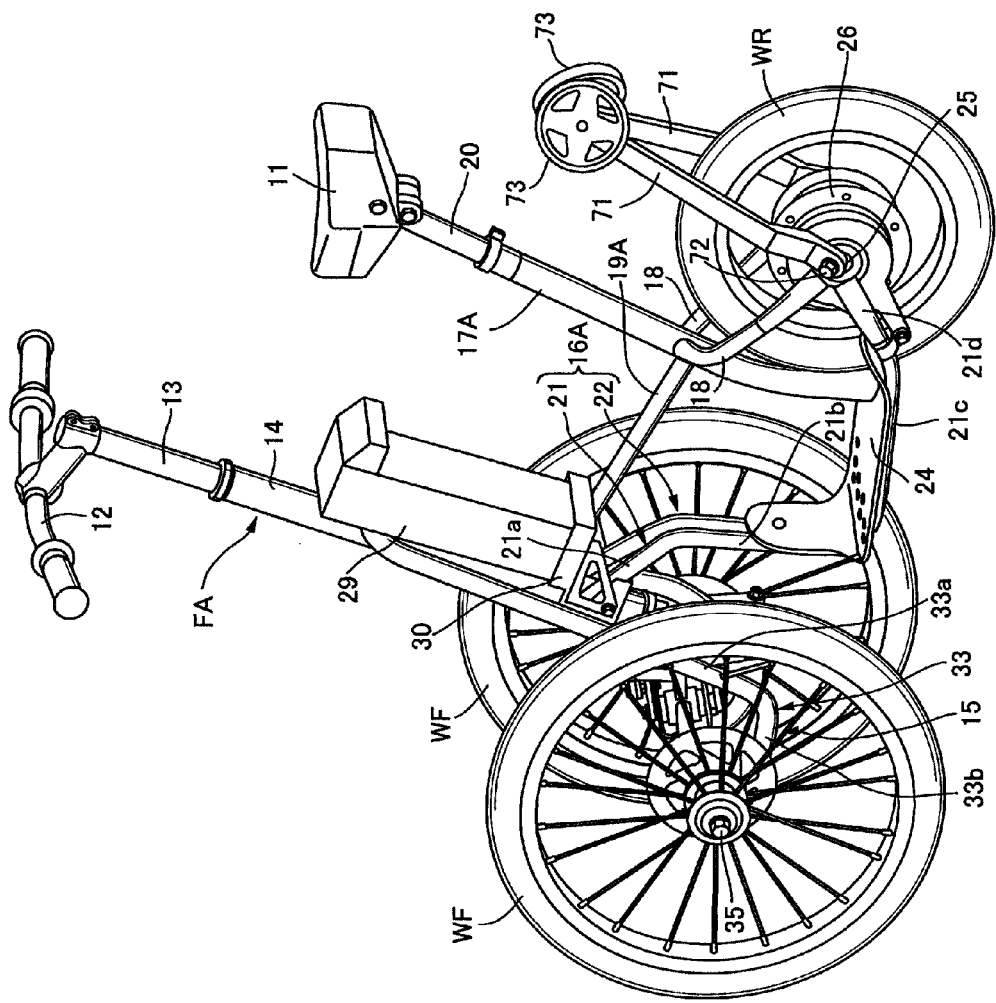
FIG. 2 is a perspective view of the three-wheeled vehicle as viewed from left-obliquely rearward.
Figure 3:
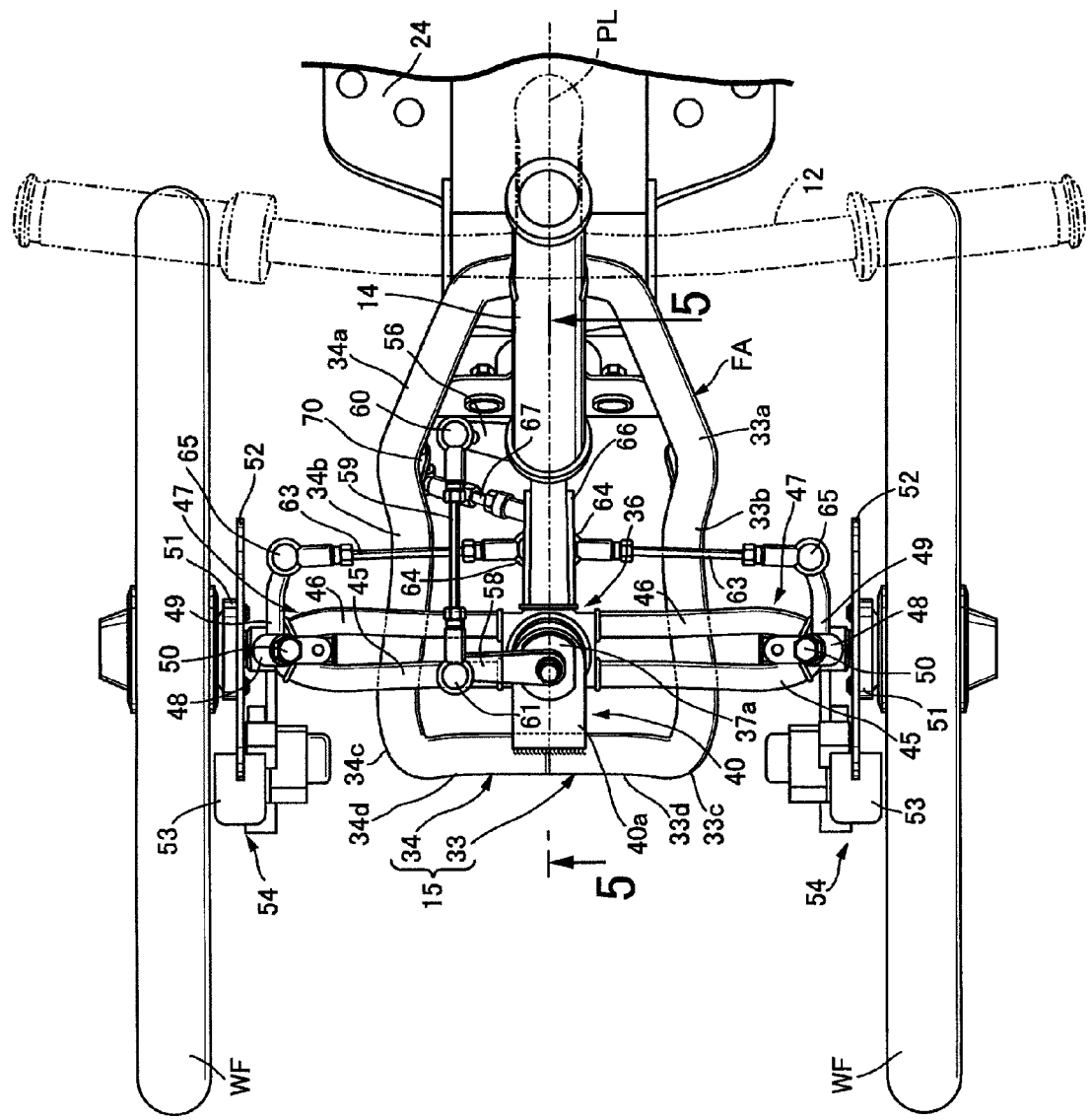
FIG. 3 is a view as viewed from arrow 3 in FIG. 1.
Figure 4:
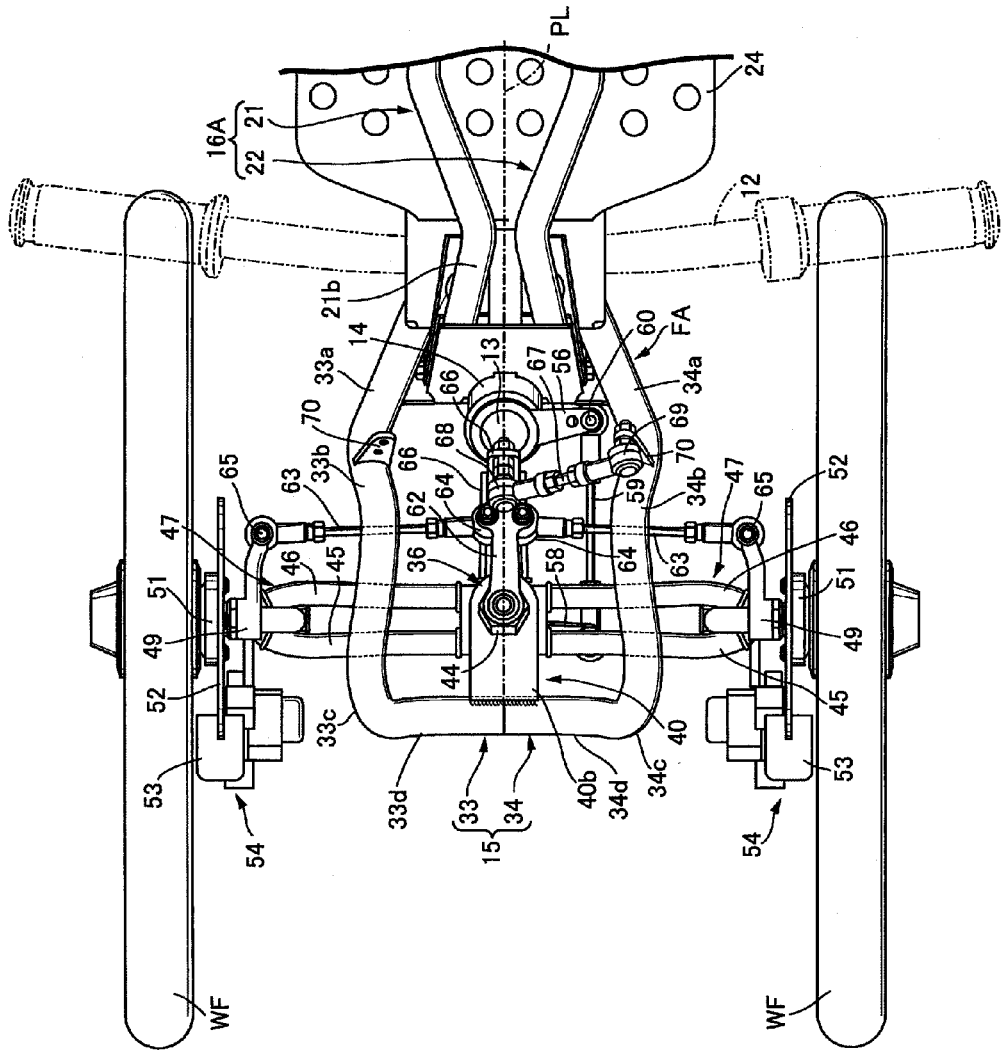
FIG. 4 is a view as viewed from arrow 4 in FIG. 1.

Embodiments of the present invention will be described with reference to the accompanying drawings. Directional indicators such as front and rear or back, left and right, and up and down in the following description are referenced to an occupant riding on a vehicle.

A first embodiment of the present invention is described with reference to FIGS. 1 to 6. Referring first to FIGS. 1 to 4, a vehicle is a tricycle having two front wheels WF, WF steered by an occupant who sits on a seat 11 and operates a steering handlebar 12. A body frame FA of the vehicle includes a head pipe 14 which pivotally supports a steering shaft 13 having an upper end to which the steering handlebar 12 is mounted; a front frame portion 15 extending forward from the head pipe 14; a main frame portion 16A extending rearward from the head pipe 14; a seat tube 17A installed upright at an intermediate portion of the main frame portion 16A; a pair of left and right suspending frame portions 18, 18 connecting the intermediate portion of the seat tube 17A with the rear end portion of the main frame portion 16A; and a sub-frame portion 19A installed between the intermediate portion of the head pipe 14 and the intermediate portion of the seat tube 17A. A seat post 20 having the seat 11 at its upper end is fixedly inserted into the seat tube 17A so as to make the insertion length of the seat tube 17A adjustable.

The main frame portion 16A is composed of a pair of left and right, i.e., first and second frame pipes 21, 22 having front ends secured to the corresponding left and right rear portions of the head pipe 14. The first frame pipe 21 is curvedly formed by integrally including a first front inclined portion 21a, a second front inclined portion 21b, an intermediate horizontal portion 21c and a rear inclined portion 21d. The first front inclined portion 21a is inclined rearward and downward from the intermediate portion of the head pipe 14 and extends rearward. The second front inclined portion 21b extends rearward and downward from the rear end of the first front inclined portion 21a at an inclination angle steeper than that of the first front inclined portion 21a. The intermediate horizontal portion 21c extends horizontally toward the rearward from the rear end of the second front inclined portion 21b. The rear inclined portion 21d extends rearward and upward from the rear end of the intermediate horizontal portion 21c. The second frame pipe 22 is formed symmetrically to the first frame pipe 21 with respect to a vertical plane PL (see FIGS. 3 and 4) passing a central axis of the head pipe 14 and the steering shaft 13 in the front-to-rear direction. The first and second frame pipes 21, 22 have rear ends arranged to face each other in order to hold a single rear wheel WR between them. The left and right suspending frames 18 have respective rear ends connected to the corresponding rear ends of the first and second frame pipes 21, 22.

The seat tube 17A has a lower end secured to a cross member 23 (see FIG. 1) installed between the first and second frame pipes 21, 22 at a position corresponding to the rear portion of the intermediate horizontal portion 21c of the first frame pipe 21. In addition, the seat tube 17A is installed upright so as to be slightly inclined rearward and upward from the intermediate portion of the main frame 16A as described above.

A step floor 24 provides a footrest for an occupant, and is secured onto the first and second frame pipes 21, 22 of the main frame 16A at a position corresponding to the intermediate horizontal portion 21c of the first pipe 21 such that the step floor 24 is at least partially disposed in front of the seat tube 17A. An axle 25 of the single rear wheel WR is rotatably supported between the rear end portions of the main frame portion 16A, i.e., the rear end portions of the first and second frame pipes 21, 22 and the corresponding suspending frame portions 18. Additionally, an electric motor 27 (see FIG. 1) generating power for driving the rear wheel WR is housed in a wheel-shaped housing 26 of the rear wheel WR.

A battery 28 for supplying electric power to the electric motor 27 is disposed on the seat tube 17A or the head pipe 14, i.e., on the head pipe 14 in the first embodiment. More specifically, a battery cradle 30 is installed on the lower rear surface of the head pipe 14. A battery box 29 incorporating the battery 28 is disposed on the head pipe 14 so as to be supported by the battery cradle 30. A control unit adapted to control the operation of the electric motor 27 may be housed in the battery box 29.

Figure 5:
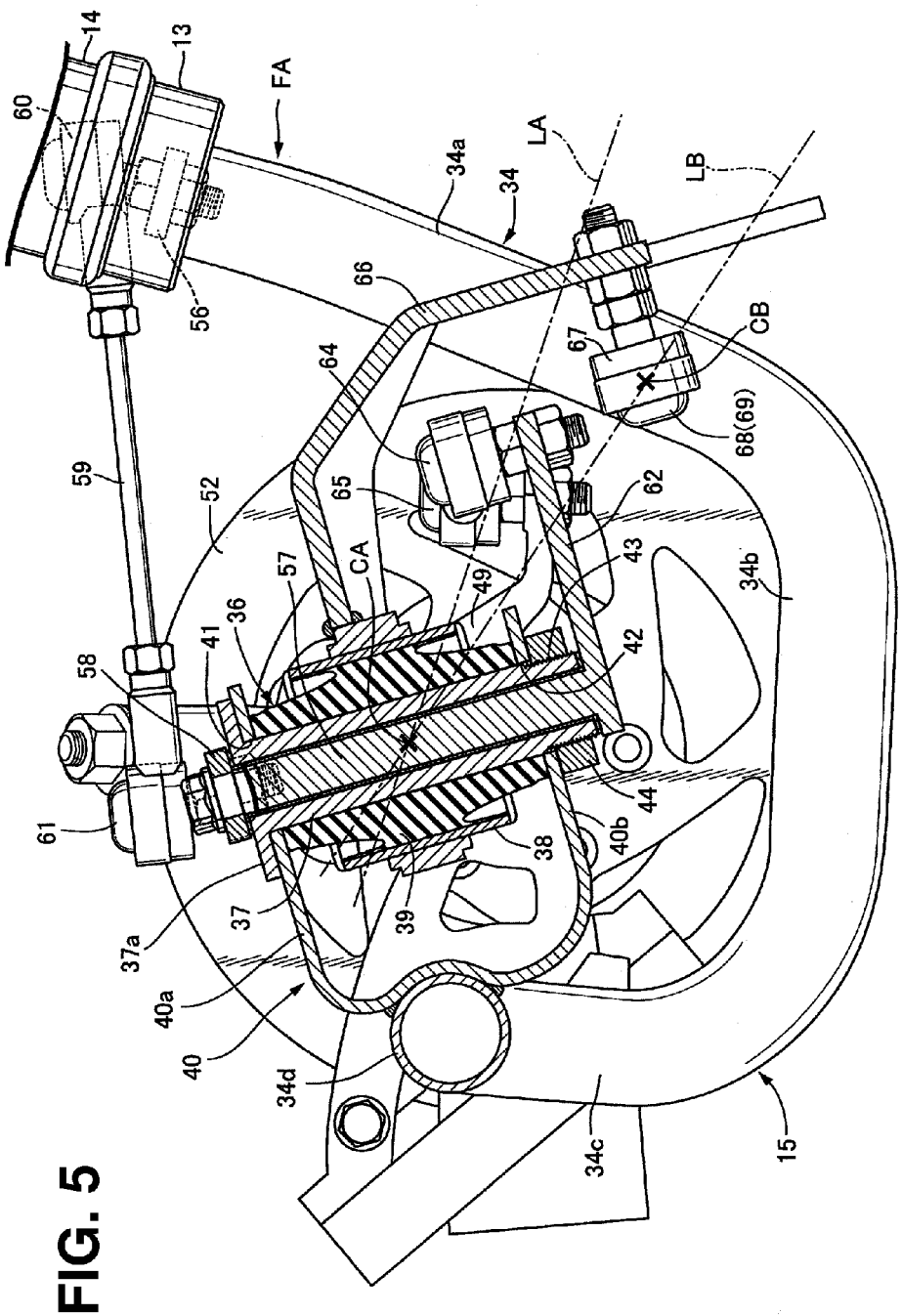
FIG. 5 is a cross-sectional view taken along line 5-5 in FIG. 3.

With additional reference to FIG. 5, the front frame 15 is composed of a pair of left and right frame members 33, 34 secured respectively to the left and right side lower portions of the head pipe 14. Both the frame members 33, 34 are formed by bending a pipe. In addition, both the frame members 33, 34 integrally include respectively first frame portions 33a, 34a, second frame portions 33b, 34b, third frame portions 33c, 34c, and fourth frame portions 33d, 34d. The first frame portions 33a, 34a are secured respectively to the right and left side lower portions of the head pipe 14 and extend downward. The second frame portions 33b, 34b are disposed below the respective axes of the axles 35 of the front wheels WF and extend forward from the corresponding lower ends of the first frame portions 33a, 34a. The third frame portions 33c, 34c extend upward from the corresponding front ends of the second frame portions 33b, 34b. The fourth frame portions 33d, 34d are disposed at positions higher than the corresponding axes of the axles 35 of the front wheels WF and extend vehicle-widthwise inward from the corresponding upper ends of the third frame portions 33c, 34c. Both the frame members 33, 34 are formed in a symmetrical shape with respect to the vertical plane PL which passes the central axes of the head pipe 14 and the steering shaft 13 in the front-to-rear direction. Additionally, the left and right fourth frame portions 33d, 34d in the present embodiment have vehicle-widthwise inner end portions butted to and joined to each other.

A bushing 36 includes an inner cylinder 37, an outer cylinder 38 surrounding the inner cylinder 37, and an elastic member 39 interposed between the inner cylinder 38 and the outer cylinder 39. The inner cylinder 37 is supported at the vehicle-widthwise central portion of the front frame 15 and has a central axis that extends vertically while slightly inclining forward and upward.

A U-shaped bracket 40 opening toward the rear of the vehicle body is secured to the vehicle-widthwise central portion of the front end of the front frame 15, that is, to the inner end portions of the left and right fourth frame portions 33d, 34d of the front frame portion 15. In the present embodiment, the bracket 40 integrally includes an upper plate portion 40a and a lower plate portion 40b which form respectively coaxial insertion holes 41, 42 and are secured to the inner end portions of the fourth frame portions 33d, 34d.

The inner cylinder 37 of the bushing 36 is secured to the bracket 40. More specifically, the inner cylinder 37 is integrally provided with a flange 37a at its upper end and is inserted into the insertion holes 41, 42 of the upper plate portion 40a and the lower plate portion 40b of the bracket 40. The flange 37a overlaps the upper plate portion 40a from above. An external thread 43 is carved on an outer surface of a projecting portion of the inner cylinder 37, the projecting portion extending below the lower plate portion 40b. The elastic member 39 of bushing 36 is disposed between the upper plate portion 40a and the lower plate portion 40b, such that a lower end of the elastic member 39 comes into contact with the lower plate portion 40b. A nut 44 is screwed onto external thread 43 such that it is brought into engagement with the lower surface of the lower plate portion 40b, thereby securing the inner cylinder 37 to the bracket 40.

A pair of left and right steering arms 47, 47 are secured to the outer cylinder 38 of the bushing 36 at their inner end portions. The steering arms 47, 47 are each composed of a pair of front and rear pipes 45, 46 and extend in the vehicle-widthwise direction. The steering arms 47, 47 are provided with cylindrical knuckle-supporting portions 48, 48 at their outer end portions. A pair of left and right knuckles 49, 49 individually and pivotally supporting the left and right front wheels WF, WF are steerably supported by the corresponding knuckle-supporting portions 48 via kingpins 50, 50. In this way, the steering arms 47 are disposed behind the third frame portions 33c, 34d of the front frame portion 15. The third frame portions 33c, 34d are disposed forward of the corresponding steering arms 47 so as to extend upward from the corresponding front ends of the second frame portions 33b, 34b.

Incidentally, disk brakes 54, 54 are each attached to a corresponding one of the left and right front wheels WF, WF. The disk brakes 54, 54 have respective brake disks 52, 52 attached to respective wheelhubs 51, 51 of the front wheels WF, WF and respective calipers 53, 53. The calipers 53, 53 are supported by the corresponding knuckles 49, 49 so as to straddle the corresponding brake disks 52, 52.

A first lever 56 turns together with the steering shaft 13 and is mounted to the lower end portion of the steering shaft 13 passing through the head pipe 14. A second lever 58 is mounted to an upper end portion of a sub-steering shaft 57, the sub-steering shaft 57 pivotally passing through the inner cylinder 37 of the bushing 36. A connecting rod 59 has a first end connected to the first lever 56 via a first universal joint 60 and a second end connected to the second lever 58 via a second universal joint 61.

A third lever 62 is installed at a lower end portion of the sub-steering shaft 57. A pair of left and right tie rods 63, 63 individually corresponding to the left and right front wheels WF have first ends connected to the third lever 62 via corresponding third universal joints 64, 64. Both the tie rods 63, 63 have second ends connected to the corresponding left and right knuckles 49, 49 via corresponding fourth universal joints 65, 65.

A fourth lever 66 is secured to a rear portion of the outer cylinder 38. A rigid movement-transmitting rod 67 and has a first end connected to the fourth lever 66 via a fifth universal joint 68 and a second end connected to the body frame FA via a sixth universal joint 69. In this way, in the present embodiment, the movement-transmitting rod 67 is connected at the first end to the fourth lever 66 via the fifth universal joint 68 and at the second end to a support plate 70 secured to the right second frame portion 34b of the front frame portion 15 of the body frame FA via the sixth universal joint 69.

Additionally, as most clearly shown in FIGS. 1 and 5, the sixth universal joint 69 is disposed below an imaginary vehicle-body swing axis LA (relative to the ground surface) in such a manner that the imaginary vehicle-body swing axis LA intersects with an imaginary arm swing axis LB (relative to the ground) as viewed in side elevation. The imaginary vehicle-body swing axis LA connects a swing center of the steering arms 47, 47, i.e., a center CA of the bushing 36, with a ground contact point of the rear wheel WR. The imaginary arm swing axis LB connects a center CB of the sixth universal joint 69 with the swing center CA of the steering arms 47, 47 and is inclined in an anterosuperior manner at a steeper angle than the imaginary vehicle-body swing axis LA. The sixth universal joint 69 is installed between the rigid movement-transmitting rod 67 and the body frame FA so as to transmit the tilting movement of the vehicle body to the fourth lever 66.

A pair of left and right auxiliary wheel support arms 71, 71 are each pivotally supported at a first end by the rear portion of the main frame portion 16A of the body frame FA via corresponding support shafts 72. Auxiliary wheels 73, 73 are rotatably supported at a second end of the auxiliary wheel support arms 71, 71.

Figure 6:
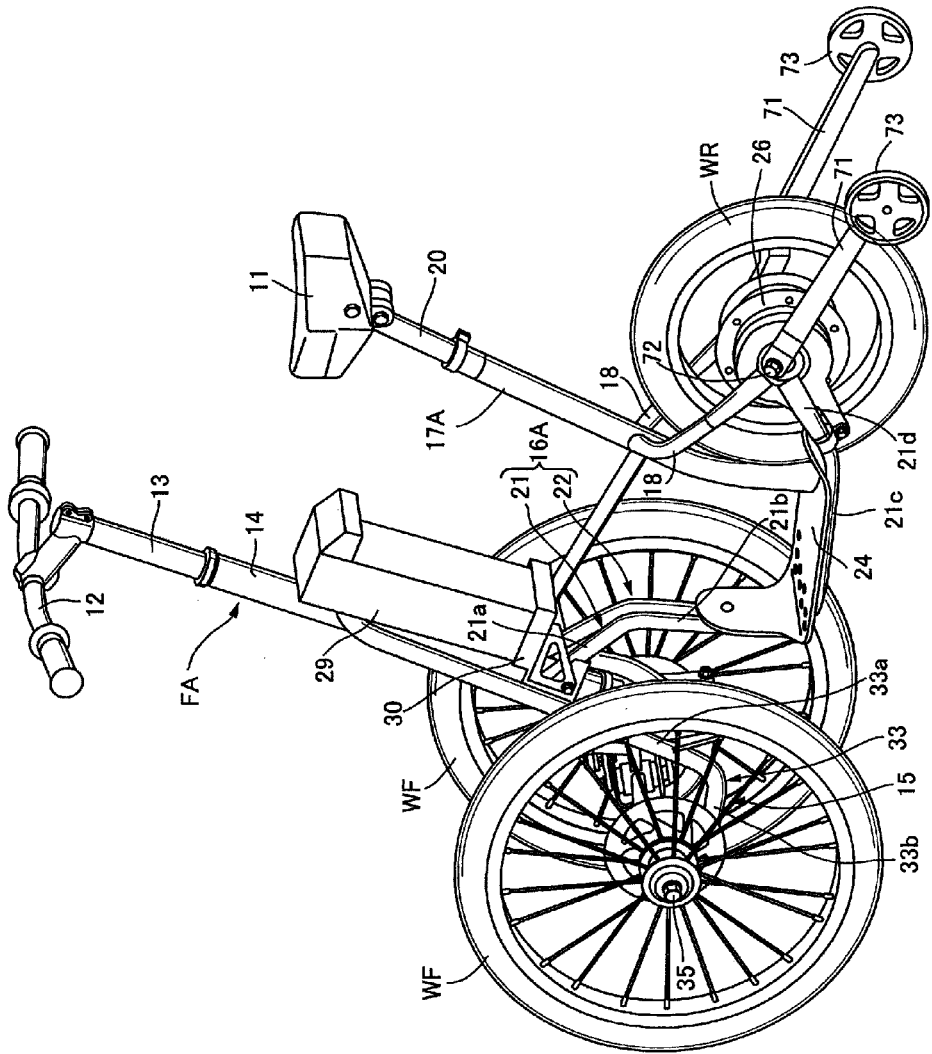
FIG. 6 is a perspective view of the three-wheeled vehicle with auxiliary wheels brought into contact with the ground, corresponding to FIG. 2.

Additionally, the auxiliary wheel support arms 71 can be turned between a retracted position where the auxiliary wheels 72 are arranged above the rear wheel WR as shown in FIG. 1 and a deployed position where the auxiliary wheels 72 are in contact with the ground at a position in the rear of the rear wheel WR as shown in FIG. 6. The retracted and deployed positions of the auxiliary wheel support arms 71, 71 are fixedly held.

Both the auxiliary wheel support arms 71 are movably supported by the rear portion of the main frame portion 16A in such a manner that the auxiliary wheels 73 are brought into proximal contact with each other in the retracted position. In this manner, it is possible to prevent the auxiliary wheels 73 from protruding outward from the sides of the vehicle body in a retracted state.

Next, a description is given of the operation of the first embodiment. The body frame FA has the front frame portion 15 extending forward from the head pipe 14. A bushing 36 includes an inner cylinder 37, an outer cylinder 38 surrounding the inner cylinder 37, and an elastic member 39 interposed between the inner cylinder 38 and the outer cylinder 39. The inner cylinder 37 is supported at the vehicle-widthwise central portion of the front frame 15 and has a central axis that extends vertically while slightly inclining forward and upward. The inner end portions of the left and right steering arms 47 are secured to the outer cylinder 38. The left and right knuckles 49 are steerably supported by the corresponding knuckle-supporting portions 48 installed at the outer end portions of the left and right steering arms 47. The left and right front wheels WF are individually and pivotally supported respectively by the left and right knuckles 49. The first lever 56 turns together with the steering shaft 13 and is mounted to the lower end portion of the steering shaft 13 passing through the head pipe 14. A second lever 58 is mounted to an upper end portion of a sub-steering shaft 57, the sub-steering shaft 57 pivotally passing through the inner cylinder 37 of the bushing 36. A connecting rod 59 has a first end connected to the first lever 56 via a first universal joint 60 and a second end connected to the second lever 58 via a second universal joint 61. In this manner, the first lever 56 is connected via the first and second universal joints 60, 61 and the connecting rod 59 to the second lever 58 mounted to the upper end portion of the sub-steering shaft 57 pivotally passing through the inner cylinder 37. The third lever 62 installed at the lower end portion of the sub-steering shaft 57 is connected to the left and right knuckles 49 via the corresponding individual tie rods 63, and the corresponding third and fourth universal joints 64, 65. The rigid movement-transmitting rod 67 has a has the first end connected via the fifth universal joint 68 to the fourth lever 66 secured to the rear portion of the outer cylinder 38 and the second end connected to the body frame FA via the sixth universal joint 69.

In this way, when the steering handlebar 12 is operated, the turning of the steering shaft 13 is transmitted to the left and right knuckles 49 via the first lever 56, the connecting rod 59, the sub-steering shaft 57, the second lever 58 and the corresponding left and right tie rods 63. The front wheels WF pivotally supported by the left and right knuckles 49 are steered. Thus, steering stability similar to that of a four-wheeled vehicle can be obtained. In addition, even if an occupant gets off the vehicle and releases her or his hands from the steering handlebar 12, the vehicle can maintain an upright position.

If the occupant banks the vehicle body toward the inside of a turn, the force from banking is applied to the outer cylinder 38 of the bushing 36 via the rigid movement-transmitting rod 67. The force from banking is further transmitted from the outer cylinder 38 to the left and right knuckles 49 via the corresponding left and right steering arms 47. Therefore, the direction of the force applied by banking is the same as the operating direction of the steering shaft 13. Thus, satisfactory turning performance can be exhibited.

Additionally, the sixth universal joint 69 is disposed below the imaginary vehicle-body swing axis LA in such a manner that the imaginary vehicle-body swing axis LA (relative to the ground) intersects with the imaginary arm swing axis LB (relative to the ground) as viewed in a side elevation. The imaginary vehicle-body swing axis LA connects the swing center CA of the steering arms 47, 47 with the ground contact point of the rear wheel WR. The imaginary arm swing axis LB connects the center CB of the sixth universal joint 69 with the swing center CA of the steering arms 47 and is inclined in an anterosuperior manner at a steeper angle than the imaginary vehicle-body swing axis LA. The sixth universal joint 69 is installed between the movement-transmitting rod 67 and the body frame FA so as to transmit the tilting movement of the vehicle body to the fourth lever 66. In this way, if the occupant banks the vehicle body toward the inside of a turn, the force from banking is reliably applied to the outer cylinder 38 of the bushing 36. Therefore, the direction of the force applied by the banking of the vehicle body is positively allowed to coincide with the operating direction of the steering shaft 13. Thus, more satisfactory turning performance can be exhibited.

The front frame portion 15 includes the left and right first frame portions 33a, 34a secured respectively to the left and right lower side portions of the head pipe 14 and extending downward; the left and right second frame portions 33b, 34b disposed below the corresponding axes of the axles 35 of the front wheels WF and extending forward from the corresponding lower ends of the first frame portions 33a, 34a; the left and right third frame portions 33c, 34c disposed in front of the steering arms 47 and extending upward from the corresponding front ends of the second frame portions 33b, 34b; and the left and right fourth frame portions 33d, 34d disposed at respective positions higher than the corresponding respective axes of the axles 35 and extending vehicle-widthwise inward from the corresponding upper ends of the left and right third frame portions 33c, 34c. The front frame portion 15 is formed in a symmetrical shape with respect to the vertical plane PL which passes the central axis of the steering shaft 13 in the front-to-rear direction. Thus, the front frame portion 15 can be formed compactly so as to surround the steering mechanism including the bushing 36.

The U-shaped bracket 40 opening toward the rear of the vehicle body is supported at the vehicle-widthwise central portion of the front end of the front frame portion 15 and supports the bushing 36. The bushing 36 includes an inner cylinder 37, an outer cylinder 38 surrounding the inner cylinder 37, and an elastic member 39 interposed between the inner cylinder 38 and the outer cylinder 39. The inner cylinder 37 of the bushing 36 is secured to the bracket 40. In this manner, the inner cylinder 37 of the bushing 36 can be compactly secured to the body frame FA.

The single rear wheel WR driven by the electric motor 27 is suspended by the body frame FA. In addition, the battery 28 for supplying electric power to the electric motor 27 is disposed on the head pipe 14. Therefore, the battery 28 can be compactly disposed within the vehicle, without causing increases to the dimensions of the vehicle.

The left and right folding auxiliary wheels 73 are pivotally supported at the rear portion of the body frame FA in such a manner as to be brought into contact with the ground at a position in the rear of the rear wheel WR in the deployed state. Therefore, the vehicle can travel stably and the auxiliary wheels contribute to the stabilization of the vehicle body posture particularly during travel on an inclined surface, for example on a slope or the like.

The body frame FA includes the head pipe 14, the main frame portion 16A extending rearward from the head pipe 14, the seat tube 17A installed upright at the intermediate portion of the main frame portion 16A, and the suspending frame portions 18, 18 connecting the intermediate portion of the seat tube 17A with the rear end portion of the main frame portion 16A. A step floor 24 provides a footrest for the occupant, and is secured onto the first and second frame pipes 21, 22 of the main frame 16A at a position corresponding to the intermediate horizontal portion 21c of the first pipe 21 such that the step floor 24 is at least partially disposed in front of the seat tube 17A. The rear wheel WR is rotatably supported at the attachment portion between the rear end portion of the main frame portion 16A and the corresponding suspending frame portions 18, 18. Also, according to this arrangement, the rear wheel WR can be pivotally supported in a stable manner.

Figure 7:
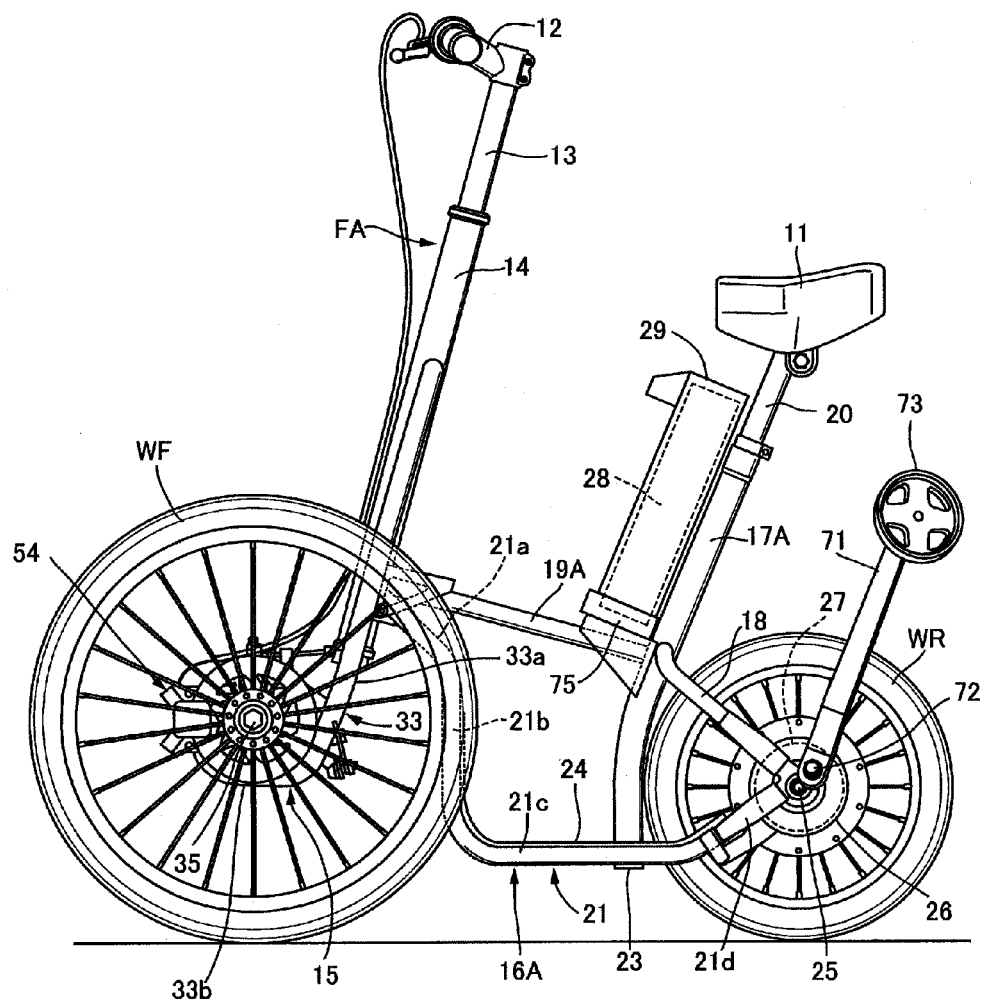
FIG. 7 is a left lateral view of a three-wheeled vehicle according to a second embodiment.

A second embodiment of the present invention is described with reference to FIG. 7. Herein, all elements are the same as in the first embodiment unless otherwise specified in this embodiment. The battery 28 for supplying electric power to the electric motor 27 for generating power for driving a rear wheel WR is disposed on a seat tube 17A constituting part of a body frame FA.

More specifically, a battery cradle 75 is installed on the lower front surface of the front seat tube 17A. A battery box 29 incorporating the battery 28 is disposed on the seat tube 17A so as to be supported by the battery cradle 75.

Therefore, the battery 28 can be compactly disposed within the vehicle, without causing increases to the dimensions of the vehicle. In addition, the battery 28 is disposed at a position closer to the electric motor 27 than that of the first embodiment. Therefore, the wiring between the battery 28 and the electric motor 27 can be shortened.

Figure 8:
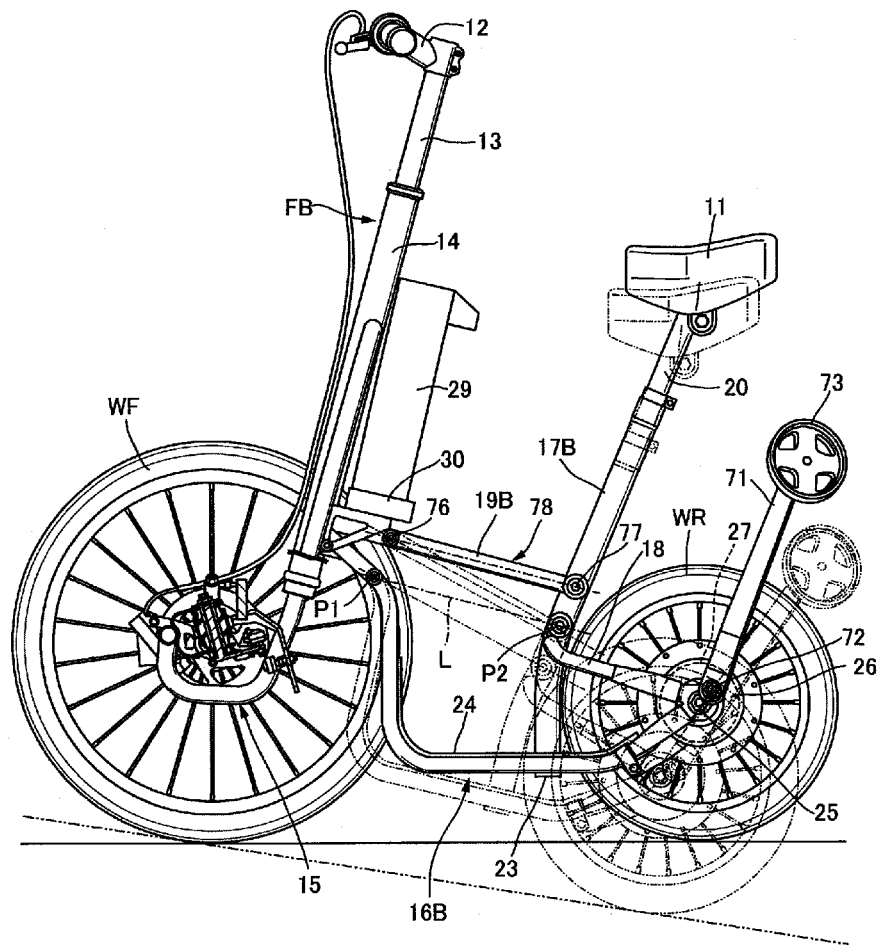
FIG. 8 is a partial-cutout left lateral view of a third embodiment.

A third embodiment of the present invention is described with reference to FIG. 8. Herein, all elements are the same as in the first embodiment unless otherwise specified in this embodiment. The body frame FB includes the head pipe 14; the front frame portion 15 extending forward from the head pipe 14; the main frame portion 16B extending rearward from the head pipe 14; the seat tube 17B installed upright at an intermediate portion of the main frame 16B; the pair of left and right suspending frames 18, 18 connecting the intermediate portion of the seat tube 17B with the rear end portion of the main frame 16B; and the sub-frame portion 19B installed between the intermediate portion of the head pipe 14 and the intermediate portion of the seat tube 17A. The seat post 20 having the saddle 11 at its upper end is fixedly inserted into the seat tube 17B so as to make the insertion length of the seat tube 17B adjustable.

A first pivot point P1 is set at the front portion of the main frame portion 16B. A portion of the main frame portion 16B forward of the first pivot point P1 and the head pipe 14 are rotatable around the first pivot point P1. A second pivot point P2 is set at the intermediate portion of the seat tube 17B at a position above the attached portion of the suspending frame portion 18. A portion of the seat tube 17B above the second pivot point P2 and a seat post 20 on which a saddle 11 is installed at its upper end are rotatable around the second pivot point P2.

The sub-frame portion 19B extends parallel to a straight line L connecting the first and second pivot points P1, P2 together. The sub-frame portion 19B has a first end which is pivotally connected to the head pipe 14 or the main frame 16B (the head pipe 14 in the third embodiment) via a connecting pin 76 and a second end which is pivotally connected to the seat tube 17B via a connecting pin 77. The connecting pins 76, 77 have axes parallel to the pivot axes of the first and second pivot points P1, P2.

In this way, a portion of the body frame FB and the sub-frame portion 19B form a parallel link 78. In the third embodiment, a portion of the main frame portion 16B of the body frame FB, a portion of the head pipe 14 and a portion of the seat tube 17B constitute the parallel link 78.

The posture of a portion of the main frame portion 16B forward of the first pivot point P1 and the head pipe 14, and the posture of a portion of the seat tube 17B above the second pivot point P2 and the seat post 20 including the saddle 11 are maintained by frictional forces at the first and second pivot points P1, P2. The postures can be changed by the application of a load greater than the frictional forces.

According to the third embodiment, the head pipe 14 and the saddle 11 can be tilted back and forth during the traveling on an inclined road surface such as a slope or the like, whereby a riding posture can be maintained.

Figure 9:
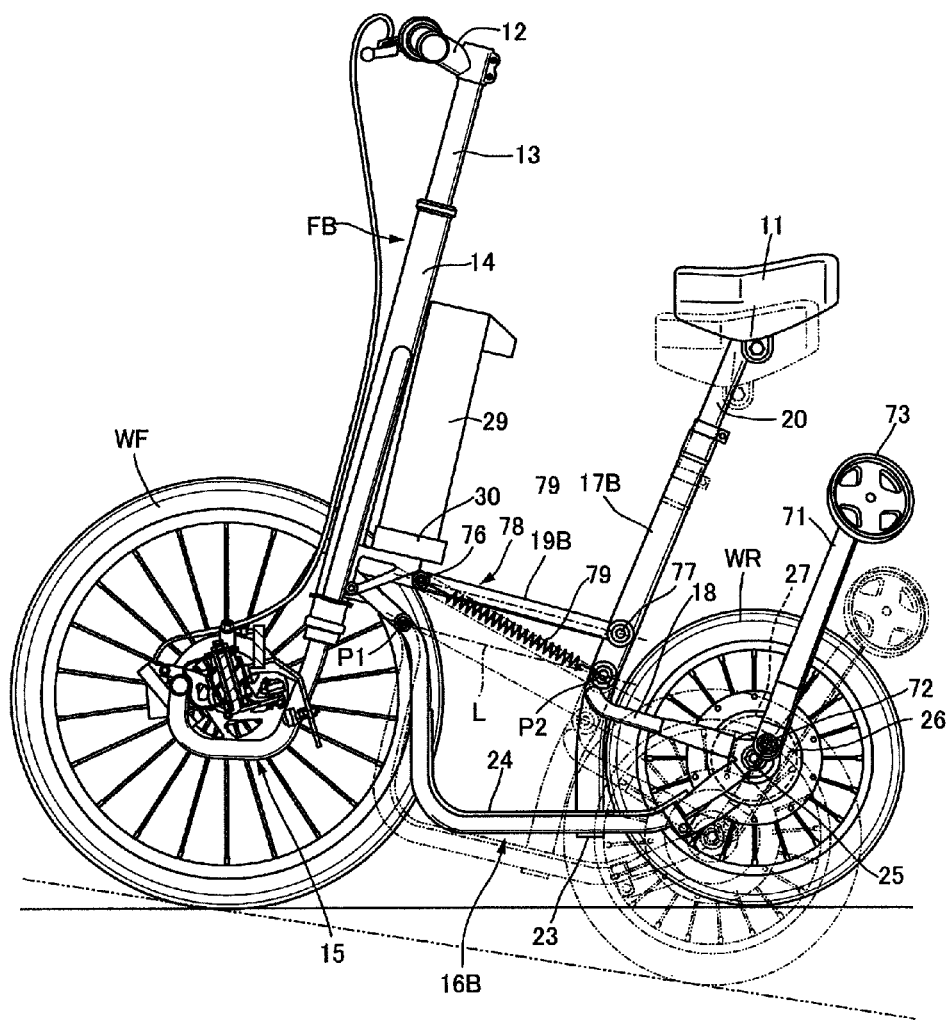
FIG. 9 is a partial-cutout left lateral view of a fourth embodiment, corresponding to FIG. 8.

A fourth embodiment of the present invention is described with reference to FIG. 9. Herein, all elements are the same as in the previous embodiments unless specifically specified in this embodiment. The parallel link 78 composed of a portion of the body frame FB and the sub-frame portion 19B is provided with a suspension 79. The suspension 79 is installed between one end portion of the sub-frame portion 19B and one of the first and second pivot points P1, P2 so as to be located in a line running diagonal to the parallel link 78. In this embodiment, the suspension 79 is installed between a connecting pin 76 connecting the one end portion of the sub-frame portion 19B with the head pipe 14 and the second pivot point P2 located in the intermediate portion of the seat tube 17B.

According to the fourth embodiment, while maintaining a basic framework of the parallel link 78, the suspension 79 installed on the parallel link 78 can absorb vibration by deforming the frame formation when a given load is applied thereto. In addition, the suspension 79 is disposed in a line running diagonal to the parallel link 78, which allows for the effective arrangement of the suspension 79.

Figure 10:
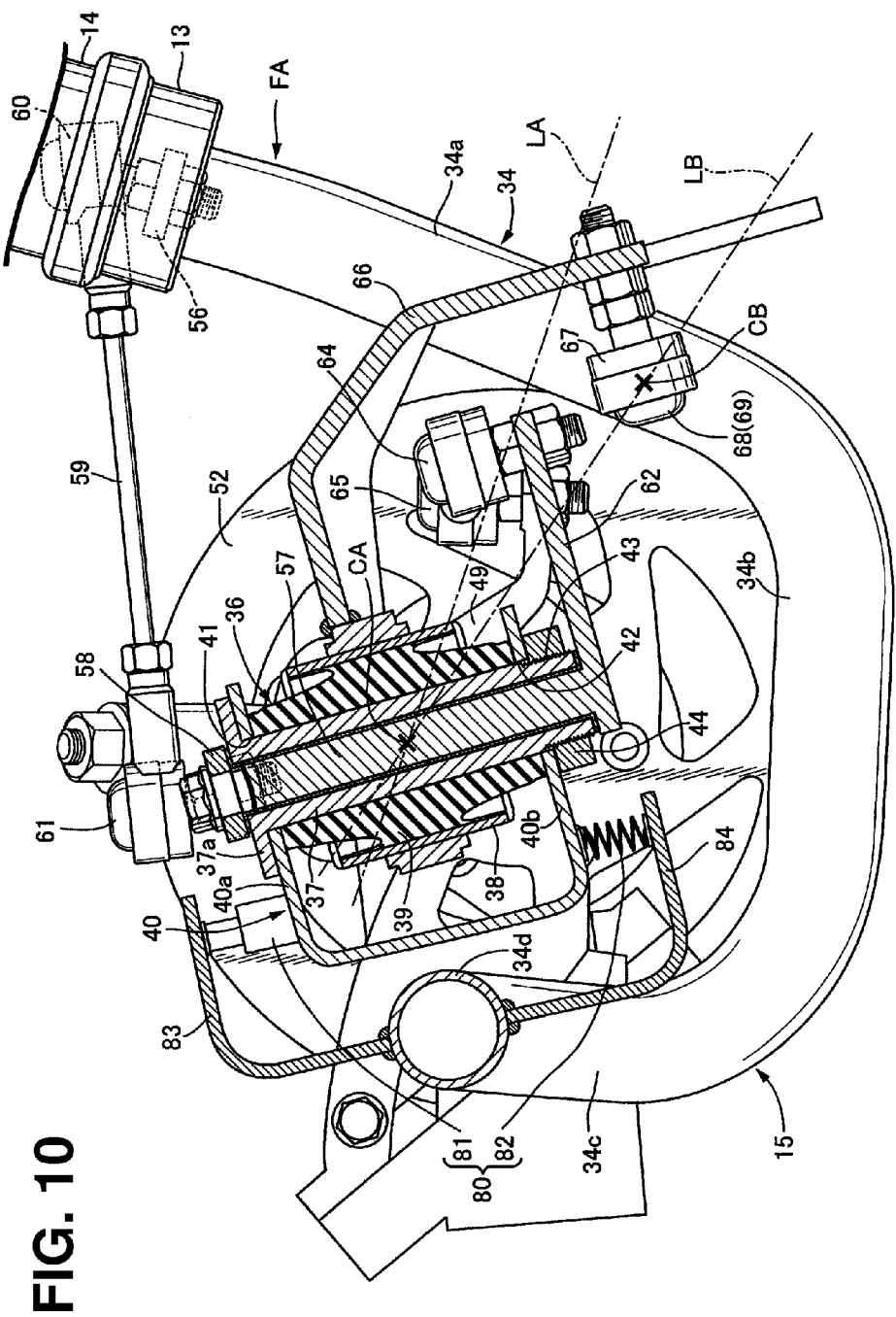
FIG. 10 is a cross-sectional view of a fifth embodiment, corresponding to FIG. 5.

A fifth embodiment of the present invention is described with reference to FIG. 10. Herein, all elements are the same as in the first embodiment unless otherwise specified in this embodiment. A damper mechanism 80 is disposed between a vehicle-widthwise central portion of a front frame 15 and the bracket 40 mentioned earlier. The damper mechanism 80 is composed of a hydraulic damper 81 and a spring 82. The hydraulic damper 81 is installed at the vehicle-widthwise central portion of the front frame 15 and between an upper support plate 83 disposed above the bracket 40 and the bracket 40. The spring 82 is installed at the vehicle-widthwise central portion of the front frame portion 15 and between a lower support plate 84 disposed below the bracket 40.

According to the fifth embodiment, it is possible to effectively suppress the vibration applied to the steering handlebar 12 from the vehicle body during travel in addition to the damping effect of the bushing 36.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

For example, the embodiments described above are such that the rear wheel WR is driven by the electric motor 27. However, the electric motor 27 and the step floor 24 can be omitted and thus the vehicle can be configured as a bicycle or a pedal-driven vehicle. Alternatively, a motor-assisted bicycle can be configured. The auxiliary wheel support arm 71 and the auxiliary wheel 73 are not essential and can be omitted.

The present invention is not limited to the three-wheeled vehicle with two front wheels, but can also be configured for use on a four-wheeled vehicle.

What is claimed is:

1. A vehicle comprising:
a body frame having a rear wheel rotatably mounted thereon, the body frame comprising a head pipe; in which a steering handlebar is mounted to an upper end of a steering shaft, and a front frame portion extending forward from the head pipe,
a bushing operatively attached to the head pipe and comprising:
an inner cylinder supported at a vehicle-widthwise central portion of the body frame and having a vertically extending central axis,
an outer cylinder, the outer cylinder surrounding the inner cylinder, and
an elastic member interposed between the inner cylinder and the outer cylinder,
a pair of left and right steering arms extending in opposed vehicle-widthwise directions and having inner end portions secured to the outer cylinder, and knuckle-supporting portions defined at outer end portions thereof,
a sub-steering shaft pivotally passing through the inner cylinder;
a pair of left and right knuckles individually and pivotally supporting the corresponding respective left and right front wheels, the knuckles being steerably supported by the corresponding knuckle-supporting portions of the left and right steering arms,
a first lever mounted to a lower end portion of the steering shaft so as to be turned together with the steering shaft, and a second lever mounted to an upper end portion of the sub-steering shaft, the first and second levers connected via a connecting rod,
a third lever installed at a lower end portion of the sub-steering shaft, the third lever connected to the left and right knuckles via corresponding individual tie rods,
a fourth lever secured to a rear portion of the outer cylinder, and
a rigid movement-transmitting rod having a first end connected to the fourth lever via a first universal joint, and a second end connected to the body frame via a second universal joint.

2. The vehicle according to claim 1,
wherein:
the left and right front wheels have axles having axes,
the front frame portion includes:
a pair of left and right first frame portions secured respectively to left and right lower side portions of the head pipe and extending downward therefrom;
a pair of left and right second frame portions disposed below the corresponding axes of the axles of the front wheels and extending forward from corresponding lower ends of the first frame portions;
a pair of left and right third frame portions disposed in front of the steering arms and extending upward from the corresponding front ends of the second frame portions; and
a pair of left and right fourth frame portions disposed at positions higher than the corresponding axes of the axles and extending vehicle-widthwise inward from the corresponding upper ends of the pair of left and right third frame portions, and
the front frame portion is formed in a symmetrical shape with respect to a vertical plane which passes a central axis of the steering shaft in the front-to-rear direction.

3. The vehicle according to claim 1, wherein a U-shaped bracket opening toward the rear of the vehicle body is supported by a vehicle-widthwise central portion of a front end of the front frame portion, and wherein the inner cylinder of the bushing is secured to the bracket.

4. The vehicle according to claim 1, further comprising:
an occupant's seat,
a single rear wheel,
an electric motor suspended by the body frame,
a battery to power the electric motor, and
wherein: the body frame has a seat tube extending vertically so as to support the occupant's seat, the single rear wheel is suspended by the body frame and is driven by the electric motor, and the battery is disposed on the seat tube or the head pipe.

5. The vehicle according to claim 3, wherein a damper mechanism is disposed between the bracket and the front frame portion.

6. The vehicle according to claim 4, wherein a pair of left and right folding auxiliary wheels is pivotally supported at the rear portion of the body frame in such a manner as to be brought into contact with ground at a position in the rear of the rear wheel in a deployed state thereof.

7. The vehicle according to claim 4, further comprising a step floor, wherein:
the body frame includes a main frame portion extending rearward from the head pipe;
the seat tube has an intermediate portion and is secured in an upright position at an intermediate portion of the main frame portion;
a suspending frame portion connects the intermediate portion of the seat tube with a rear end portion of the main frame portion,
the step floor is secured onto the main frame portion so as to be at least partially disposed in front of the seat tube and can be used as a footrest by an occupant, and
the rear wheel is rotatably supported at a connecting point between the rear end portion of the main frame portion and the suspending frame portion.

8. The vehicle according to claim 4, wherein:
a first pivot point where the head pipe can be swung back and forth is set at the front portion of the main frame portion,
a second pivot point where an upper portion of the seat tube including the occupant's seat can be swung back and forth is set at an intermediate portion of the seat tube,
a sub-frame extending parallel to a straight line connecting the first and second pivot points together has a first end which is pivotally connected to the head pipe or the main frame via a connecting pin and a second end which is pivotally connected to the seat tube via a connecting pin, the connecting pins having axes parallel to the pivot axes of the first and second pivot points, and
a portion of the body frame and the sub-frame constitute a parallel link.

9. The vehicle according to claim 8, wherein the parallel link is provided with a suspension.

10. The vehicle according to claim 9, wherein the suspension is installed between a first end portion of the sub-frame and one of the first and second swivel points so as to be located on a line diagonal to the parallel link.

11. A three-wheeled electric vehicle, comprising:
a body frame having a single rear wheel rotatably mounted thereon, the body frame comprising a head pipe;
an electric motor attached to the body frame for driving the rear wheel;
a battery case operatively attached to the body frame;
a battery disposed in the battery case for supplying electric power to the electric motor;
a steering handlebar mounted to an upper end of a steering shaft for steering a pair of left and right front wheels, the steering shaft pivotally supported by the head pipe;
a bushing having an inner cylinder and an outer cylinder surrounding the inner cylinder;
wherein the inner cylinder is supported at a vehicle-widthwise central portion of the body frame;
a sub-steering shaft pivotally passing through the inner cylinder;
a pair of vehicle-widthwise extending left and right steering arms having inner end portions secured to the outer cylinder, wherein the left and right front wheels are pivotally mounted at the corresponding outer end portions of the steering arms;
a first lever mounted to a lower end portion of the steering shaft so as to be turned together with the steering shaft;
a second lever mounted to an upper end portion of the sub-steering shaft, the first and second levers connected via a connecting rod;
a third lever installed at a lower end portion of the sub-steering shaft, the third lever operable to steer the left and right wheels via corresponding individual tie rods; and
a fourth lever secured to a rear portion of the outer cylinder, wherein when the body frame of the vehicle is leaning towards the inside of a turn, the effect on steering due to a leaning of the body frame is coordinated with the effect on steering due to a steering of the handlebar.

12. The three-wheeled electric vehicle according to claim 11, further comprising a rigid movement-transmitting rod having a first end connected to the fourth lever via a first universal joint, and a second end connected to the body frame via a second universal joint, such that the force from the leaning of the body frame is transmitted from the body frame to the fourth lever.

13. The three-wheeled electric vehicle according to claim 12, further comprising:
a pair of left and right knuckle support portions, the left and right knuckle-supporting portions being secured to the outer end portions of the corresponding steering arms; and
a pair of left and right knuckles supporting the corresponding left and right front wheels, the left and right knuckles being steerably supported by the corresponding knuckle support portions;
wherein the third lever is connected to the left and right knuckles via the tie rods, such that a force for steering the left and right front wheels is transmitted from steering the handlebars to the left and right front wheels.

14. The three-wheeled electric vehicle according to claim 12, further comprising: a rigid movement-transmitting rod having a first end connected to the fourth lever via a first universal joint and a second end connected to the body frame via a second universal joint;
wherein:
the bushing further comprises an elastic member interposed between the inner cylinder and the outer cylinder; and
force from leaning of the vehicle towards the inside of a turn is transmitted to the left and right front wheels via the rigid movement-transmitting rod and the bushing such that the effect on steering due to the leaning of the body frame is coordinated with the effect on steering due to the steering of the handlebar.

15. The three-wheeled electric vehicle according to claim 14, wherein:
the left and right front wheels have axles having axes,
the body frame has a front frame portion including:
a pair of left and right first frame portions secured respectively to left and right lower side portions of the head pipe and extending downward therefrom;
a pair of left and right second frame portions disposed below the corresponding axes of the axles of the front wheels and extending forward from corresponding lower ends of the first frame portions;
a pair of left and right third frame portions disposed in front of the steering arms and extending upward from the corresponding front ends of the second frame portions; and
a pair of left and right fourth frame portions disposed at positions higher than the corresponding axes of the axles and extending vehicle-widthwise inward from the corresponding upper ends of the pair of left and right third frame portions, and the front frame portion is formed in a symmetrical shape with respect to a vertical plane which passes a central axis of the steering shaft in the front-to-rear direction.

16. The three-wheeled electric vehicle according to claim 12, further comprising a U-shaped bracket and an occupant's seat; and wherein:
the body frame includes a main frame portion, a seat tube, and a front frame portion having a front end;
the seat tube extends vertically so as to support the occupant's seat;
the U-shaped bracket opens toward the rear of the vehicle body and is supported by a vehicle-widthwise central portion of the front end of the front frame portion; and
the inner cylinder of the bushing is secured to the bracket.

17. The three-wheeled electric vehicle according to claim 16, wherein a damper mechanism is disposed between the bracket and the front frame portion.

18. The three-wheeled electric vehicle according to claim 16, wherein:
a first pivot point where the head pipe can be swung back and forth is set at a front portion of the main frame portion;
a second pivot point where an upper portion of the seat tube including the occupant's seat can be swung back and forth is set at an intermediate portion of the seat tube;
a sub-frame extending parallel to a straight line connecting the first and second pivot points together has a first end which is pivotally connected to the head pipe or the main frame via a connecting pin and a second end which is pivotally connected to the seat tube via a connecting pin, the connecting pins having axes parallel to the pivot axes of the first and second pivot points; and
a portion of the body frame and the sub-frame constitute a parallel link.

19. The three-wheeled electric vehicle according to claim 18, wherein the parallel link is provided with a suspension.

20. The three-wheeled electric vehicle according to claim 19, wherein the suspension is installed between a first end portion of the sub-frame and one of the first and second swivel points so as to be located on a line diagonal to the parallel link.

* * * * *